April 29, 1969     D. R. HARTING     3,441,891
STRAIN GAGE HAVING A STRAIN RESISTANT ELECTRICAL CONNECTION
Filed May 31, 1967
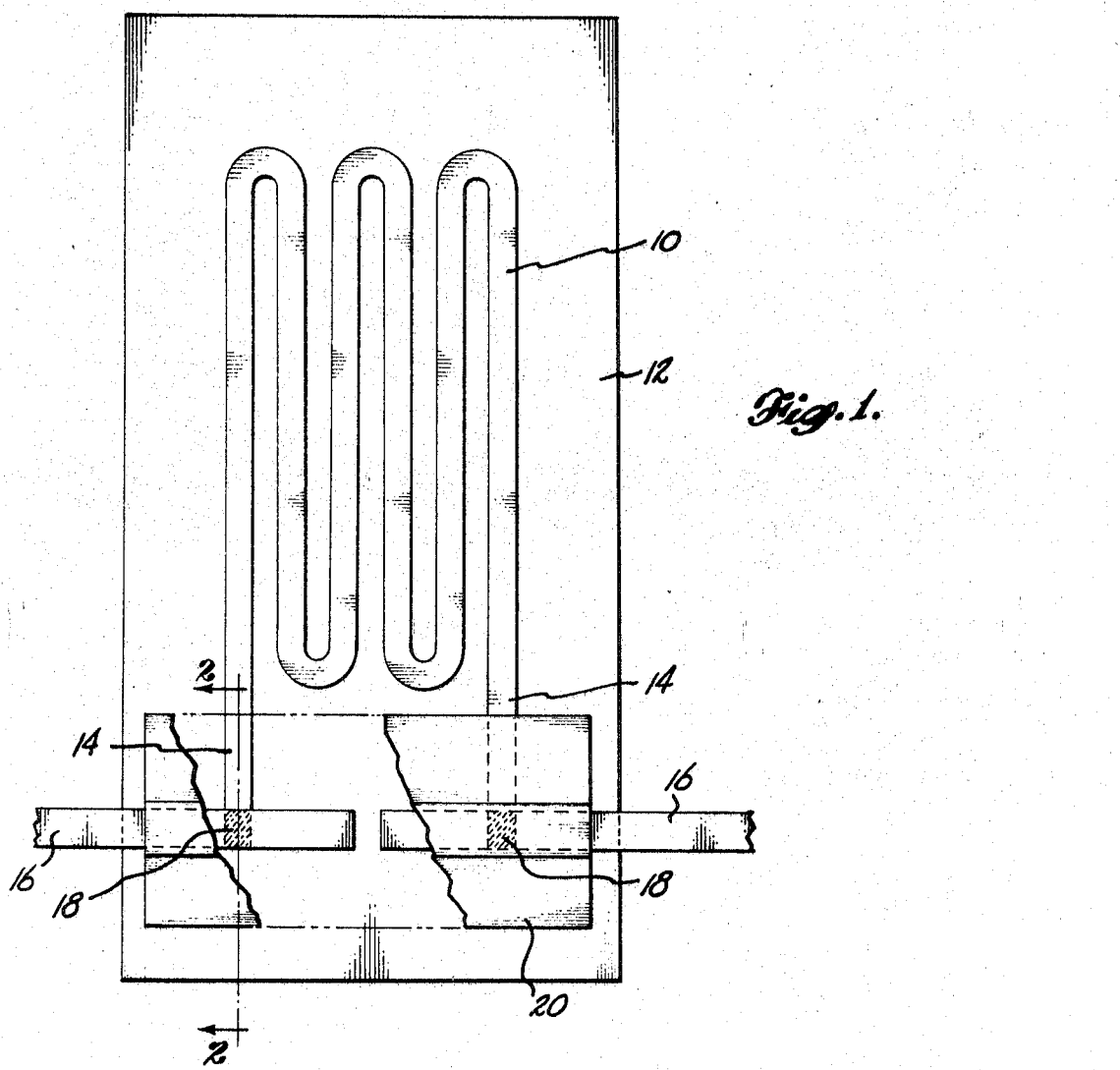
Fig. 1.
Fig. 2.
INVENTOR.
DARRELL R. HARTING
BY 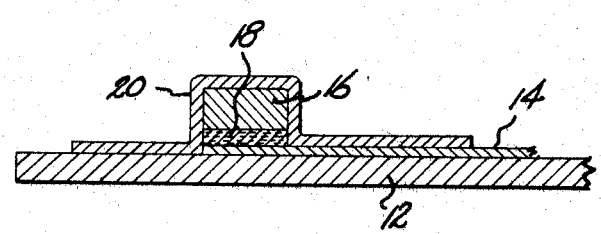
ATTORNEY

United States Patent Office 3,441,891
Patented Apr. 29, 1969

3,441,891
STRAIN GAGE HAVING A STRAIN RESISTANT
ELECTRICAL CONNECTION
Darrell R. Harting, Seattle, Wash., assignor to The Boeing
Company, Seattle, Wash., a corporation of Delaware
Filed May 31, 1967, Ser. No. 642,560
Int. Cl. G01b 7/16, 11/00
U.S. Cl. 338—6                                           5 Claims

ABSTRACT OF THE DISCLOSURE

An electrical connection to a strain gage with one conductor permitted limited movement with respect to the other and having liquid metal alloy between them. The conductors are mounted perpendicular to each other and held in place on a backing by polyfluorcarbon adhesive tape.

Background of the invention

The present invention relates to electrical connections and more particularly to electrical connections to strain gages that are required to withstand high level or repeated strains.

There are many instances wherein miniature strain gages must be connected to other circuitry located remotely from the gage. In order to reduce resistance losses in the connecting wires and to provide them with suitable strength, the connecting lead wires are often considerably larger in cross-sectional area than are the conductors in the miniature gage to which they must be attached. This results in a sudden change in cross-sectional area in the conducting path as the transition is made from the relatively large lead wire to the much smaller gage conductor. Even in those strain gage installations where the cross-sectional areas of the gage conductor and lead conductor are not disproportionate, the union of the conductors will inherently produce a discontinuity in the geometry of the conducting path.

Analysis of failure modes of such connections employed in strain gages and temperature sensors has shown that large stress concentrations occurring at the cross-sectional area transition point of the conducting path cause the connection to fail long before the operating limits of the gage itself have been reached.

This problem has become particularly acute in the installation of high elongation strain gages designed to measure strains in the order of 30%; and where the difference between the cross-sectional area of the lead wire and the strain gage conductor represents a ratio of as much as 25:1. Previous methods of making such connections include soldering, welding, or swaging the lead wire directly to the gage conductors. Failure mode analysis shows that high tensile stresses occurred in the gage grid conductor at the point of attachment to the lead wire and this failure mode was seen to occur even where the lead wire was attached perpendicularly to gage grid conductor according to the teachings of U.S. Patent No. 2,364,076.

In other connections used for foil strain gages, enlarged areas or tabs were provided at each end of the grid conductor for soldering the lead thereto. But after being subjected to a high strain environment, cracks were found to have formed in the foil conductor immediately adjacent to the solder turret indicating failure due to excessive tensile stress. In other applications wherein foil-like lead ribbons were soldered to the foil gage conductors, the solder between the lead and the gage conductor was observed to fail in the shear mode.

SUMMARY

The general purpose of this invention is to provide an electrical connection between electrical conductors that can withstand high level or repeated strains without sustaining mechanical and electrical failure. To attain this, the present invention contemplates a unique interconnection structure wherein a first electrical conductor, while maintaining electrical contact with a second electrical conductor, is nevertheless free to slide or otherwise move relative to the second electrical conductor. The interposition of a liquid metal alloy between the electrical conductors at the contact area insures that electrical continuity will be maintained through the electrical connection. Structural integrity of the electrical connection is insured by affixing an adhesive polyfluorocarbon tape over the electrical conductors holding them in relative position against a backing material and yet permitting a sufficient amount of movement of one conductor with respect to the other to prevent the buildup of high stress concentrations. The potentiometric effect caused by the movement of the conductors may be reduced or eliminated by mounting one conductor perpendicular to the other.

It is, therefore, an object of this invention to provide a strain gage with an electrical connection that is resistant to high level or repeated strains.

Another object of this invention is to provide a strain gage with an electrical connection wherein one electrical conductor is free to move with respect to the other, thus preventing the buildup of severe stress concentrations at the point of interconnection.

A further object of this invention is to provide a strain gage with an electrical connection between electrical conductors one of which is free to move with respect to the other at the point of contact wherein a liquid metal alloy is disposed between the conductors to insure electrical continuity of the connection.

BRIEF DESCRIPTION OF THE DRAWING

FIGURE 1 is a plan view, partly section, of a strain gage embodying the present invention.

FIGURE 2 is a fragmentary sectional view of the strain gage embodying the present invention taken on the line 2—2 of FIGURE 2 looking in the direction of the arrows.

DESCRIPTION OF THE PREFERRED EMBODIMENTS

While the strain resistant electrical connection taught by this invention may be used in many applications where electrical connections are subject to high level or repeated strains, such as strain gages or temperature sensors, the figures show the use of this connection with regard to a high elongation resistance strain gage in which grid 10 fabricated of electrical resistance material is mounted upon insulating backing 12. Grid 10 may be made from an etched metallic foil or small diameter wires suitably bonded to backing 12. In either configuration, it is desirable to extend the grid conductors away from the principal grid area to form end portions or gage tabs 14 in order to provide sufficient clearance for the electrical lead connection. The external electrical lead connections to grid tabs 14 are made by electrically conducting lead ribbons 16 which are disposed so as to overlap the gage tabs 14. Electrical continuity between gage tabs 14 and lead ribbons 16 is insured by an electrically conducting liquid metal 18 (more clearly shown in FIGURE 2) disposed between gage tabs 14 and lead ribbons 16 at the area of overlap. Lead ribbons 16 are yieldingly held in place on backing 12 and in contact with gage tabs 14 by adhesive polyfluorocarbon, sold under the trademark Teflon, tape 20.

In a high elongation strain gage designed to measure elongations in the order of 30%, grid 10 and gage tab 14 may be made of a 60% copper, 40% nickel alloy, sold under the trademark Constantan, in the form of a metal foil 0.0002 inch in thickness and the lead ribbon 16 may also be suitably made of Constantan metal with a thickness of 0.005 inch. Assuming an equal width for both lead ribbon 16 and grid tab 14, these thicknesses represent a cross-sectional area ratio of 25:1 for these conductors. In prior art devices exhibiting a cross-sectional area ratio of 25:1 between the lead ribbon and the grid tab where the strain gage is subjected to elongations of 30% or more, the stress concentrations imposed upon the lead ribbon-grid tab connections are so severe that the useful operating limit of the gage is drastically reduced by the inherent susceptibility of the connection to premature failure.

While these high stress concentrations have become particularly severe in the case of high elongation strain gages subjected to high level strains and having large cross-sectional area ratios between the lead ribbon and the grid tab, it should be understood that the buildup of high stress concentrations is often a serious problem for strain gage installations wherein the gage is subjected to more moderate strain levels and where the cross-sectional areas of the lead ribbon and the grid tab are not greatly different. Even if the cross-sectional areas of the lead ribbon and the grid tab are identical, the union of these two conductors will produce a discontinuity in the cross-section of the conducting path at the point of interconnection that is susceptible of high stress concentrations. Of course, this condition is aggravated where the cross-sectional area of either the lead ribbon or the grid tab is disproportionate to the other.

This invention solves the problem of high stress concentration and extends the useful limit of the gage from the limiting strength of the lead ribbon connection to the yield point of the gage grid material by eliminating high stress concentration at the point of connection due to the change in cross-sectional area of the conducting path at the point of connection between lead ribbon 16 and gage tab 14. Extensive analysis of strain gage lead ribbon connection failure has shown that early failure is due primarily to high tensile stress concentration when the connection is made by conventional attachment techniques, such as soldering, welding, swaging, etc. Under the teachings of this invention, direct structural connection between lead ribbon 16 and gage tab 14 is avoided and, subject to the restraint imposed by the adhesive Teflon tape 20, lead ribbon 16 is permitted to move with respect to gage tab 14 while still maintaining electrical contact with it through liquid metal 18. By permitting the relative movement between lead ribbon 16 and gage tab 14 during high strain applications, the only forces imposed upon the connection are the very low shear stresses introduced within liquid metal 18. By these means, high tensile stresses that would normally be concentrated at the lead ribbon connection and promote early failure of the gage are dissipated in the relative movement of lead ribbon 16 and gage tab 14, leaving only the low level shear stresses in liquid metal 18.

While the most readily available liquid metal for application between lead ribbon 16 and gage tab 14 is mercury, in many applications it would be unsuitable primarily due to its toxicity and corrosiveness. A better metal which is liquid at room temperature is an alloy comprising the following elements by weight: gallium 69.8%, indium 17.6%, and tin 12.6%. This alloy is non-toxic, easy to handle and it will not corrode most electrical conductors to which it is applied, thus permitting a longer shelf life for a strain gage having connections made with this material.

Other methods of practicing this invention, which represents a position somewhere between the use of a liquid metal conducting medium and a conventional structural connection, can be envisioned. For example, an amalgamation of a metal with lead ribbon 16 or gage tab 14, or both, could be made so that a relatively soft and mushy joint is formed. Also, electrically conductive plastics or mastics could be used in the joint region where they would not only insure electrical continuity between lead ribbon 16 and gage tab 14 but would also protect the conductors from corrosion and environmental contamination.

When using liquid metal 18 between the conductors, it has been found desirable to prepare the contacting surfaces of lead ribbon 16 and gage tab 14 in a manner that will insure reliable electrical contact. The contact surfaces of lead ribbon 16 and gage tab 14 should first be lightly abraded with pumice and washed with ethyl acetate. When liquid metal 18 is applied to the contact surfaces of lead ribbon 16 and gage tab 14, the liquid metal 18 should be agitated until it thoroughly wets the surfaces of the conductors. Of course, care must be exercised to insure that liquid metal 18 does not come in contact with any part of grid 10 other than gage tab 14 for such contamination of grid 10 will ruin the calibration of the strain gage. Before the liquid metal-coated surfaces of lead ribbon 16 and gage tab 14 are placed in contact with each other, excess liquid metal 18 should be removed from the surfaces. Experience has shown that where the gallium-indium-tin liquid metal alloy is used, a thin film of approximately 0.0005 inch thickness of liquid metal 18 will remain on the surfaces of lead ribbon 16 and gage tab 14 after the excess has been removed. However, in other applications, especially where a different liquid metal having other surface wetting characteristics is employed, it may be desirable to have a liquid metal film 18 of a thickness other than 0.0005 inch between lead ribbon 16 and gage tab 14.

While the structural integrity of the electrical connection is maintained by the overlay of adhesive Teflon tape 20, it should be realized that the connection between lead ribbon 16 and gage tab 14 purposely possesses a very low degree of rigidity. Except for the restraint imposed by Teflon tape 20 and the shear stresses of liquid metal 18, lead ribbon 16 is free to slide, especially in the longitudinal direction. It is this relatively free movement that prevents the buildup of high stress levels at the point of inter-connection between lead ribbon 16 and gage tab 14. Since Teflon tape 20 has a low modulus of elasticity, it does not transfer any significant strains between gage tab 14 and lead ribbon 16. Therefore, the only forces that are imposed within the lead ribbon-gage tab interconnection are the shear stresses within liquid metal 18 which are derived from the relative movement between lead ribbon 16 and gage tab 14. These shear stresses are several orders of magnitude lower than the tensile stresses that would be imposed upon an unyielding electrical connection of similar geometry. By using the electrical connection taught by this invention on a high elongation strain gage, the useful limit of operation of the gage can be extended from the yield strength of the connection to the yield strength of the gage grid material itself.

The relative movement permitted between lead ribbon 16 and gage grid 14 poses certain problems that must be avoided by proper assembly of the electrical connection. In particular, it should be noted that if the contact area of lead ribbon 16 on gage tab 14 were permitted to shift so as to change the length of the gage tab 14 effectively in the gage grid electrical circuit, the resistance of the gage would vary accordingly, thus invalidating the calibration of the gage. This change in gage resistance due to the shifting of the contact area of the electrical connection is referred to as the potentiometric effect of the connection. The potentiometric effect of the electrical connection taught by this invention can be reduced to insignificant levels by aligning the longitudinal axis of lead ribbon 16 perpendicular to the longitudinal axis of the gage tab 14 in the vicinity of the connection. Teflon tape 20 effectively restrains movement of lead ribbon 16 in a direction perpendicular to its longitudinal axis and the stress relieving movement of lead ribbon 16 is primarily in the longitudinal direction. It can be clearly seen in FIGURE 1 that movement of lead ribbon 16 longitudinally will not have the effect of altering the length of gage tab 14 in the grid circuit and there will be essentially no potentiometric effect from this source. Of course, a potentiometric effect may also be derived from changes in the length of the lead ribbon 16 that is effectively in the electrical circuit. However, in the typical strain gage this source of error is not significant since the electrical resistivity of the lead material is much lower than that of the gage grid material and the cross-sectional area of the lead ribbon is often much greater than that of the gage grid conductor. Thus, any changes in the length of the lead wire circuit due to movement of lead ribbon 16 along its longitudinal axis will produce a resistance change so minute compared to the resistance of the gage grid 10 that it will be normaly beyond the sensitivity of the resistance measuring instruments used in a typical strain gage installation.

Teflon tape 20 provides a convenient means for insuring the structural integrity of the electrical connection. It is sufficiently yielding to permit lead ribbon 16 to move or give and thus avoid stress concentration at the contact area and yet it has sufficient strength to maintain lead ribbon 16 in contact with gage tab 14. Other methods may be employed to accomplish the same result. For example, in some strain gages it is desirable to encapsulate the entire strain gage assembly. In this case, the bonding pressure applied to the assembly to encapsulate the grid will be sufficient to establish initial contact between lead ribbon 16 and gage tab 14. The electrical and physical contact between the two will be maintained after curing of the encapsulated assembly by the strength of the bond formed by the encapsulant itself.

In view of the foregoing, a strain resistant electrical connection has been provided wherein one electrical conductor is held in contact with a second electrical conductor in such a manner that electrical continuity is maintained between the conductors even though one conductor is permitted to move with respect to the other. The relative movement of the conductors prevents high stress concentration at the point of electrical connection, thus permitting the use of this connector in applications which experience high level or repeated strains. The conductors are connected perpendicular to each other to avoid the potentiometric effect produced by their relative movement.

I claim:
1. A strain gage having a strain resistant electrical connection comprising:
   (a) a metal foil resistance grid having an end portion;
   (b) a lead conductor disposed so as to overlap the end portion of the metal foil resistance grid;
   (c) electrical conductive means disposed between and forming a relatively soft and mushy joint with the end portion of the metal foil resistance grid and the lead conductor at the place of overlap;
   (d) restraining means whereby the end portion of the metal foil resistance grid and the lead conductor are yieldingly held in circuit closed position.
2. The device set forth in claim 1 wherein the electrically conductive means disposed between the end portion of the metal foil resistance grid and the lead conductor at the place of overlap comprises a film of liquid metal.
3. The device set forth in claim 2 wherein the liquid metal consists essentially of the following ingredients by weight: gallium 70%, indium 18%, and tin 12%.
4. A strain gage having a strain resistant electrical connection comprising:
   (a) a metal foil resistance grid having an end portion with a longitudinal axis;
   (b) a lead conductor having a longitudinal axis and disposed so as to overlap the end portion of the metal foil resistance grid with the longitudinal axis of the lead conductor essentially perpendicular to longitudinal axis of the end portion of the metal foil resistance grid;
   (c) a thin film of liquid metal disposed between the end portion of the metal foil resistance grid and the lead conductor at the place of overlap;
   (d) restraining means whereby the end portion of the metal foil resistance grid and the lead conductor are yieldingly held in circuit closed position.
5. The device set forth in claim 4 wherein the liquid metal consists essentially of the following ingredients by weight: gallium 70%, indium 18%, and tin 12%.

References Cited

UNITED STATES PATENTS

| | | | |
|---|---|---|---|
| 1,908,908 | 5/1933 | Loftis | 338—156 |
| 2,390,038 | 11/1945 | Ruge | 338—3 |
| 2,739,212 | 3/1956 | Woulley et al. | 338—2 |
| 3,005,170 | 10/1961 | Starr | 338—2 |
| 3,009,056 | 11/1961 | Bone et al. | 338—3 X |
| 3,245,017 | 4/1966 | Russell | 338—2 |

REUBEN EPSTEIN, *Primary Examiner.*

U.S. Cl. X.R.

338—222